April 26, 1949.　　G. W. MERRITT　　2,468,303
TRIP FEEDER
Filed July 19, 1944　　2 Sheets-Sheet 1
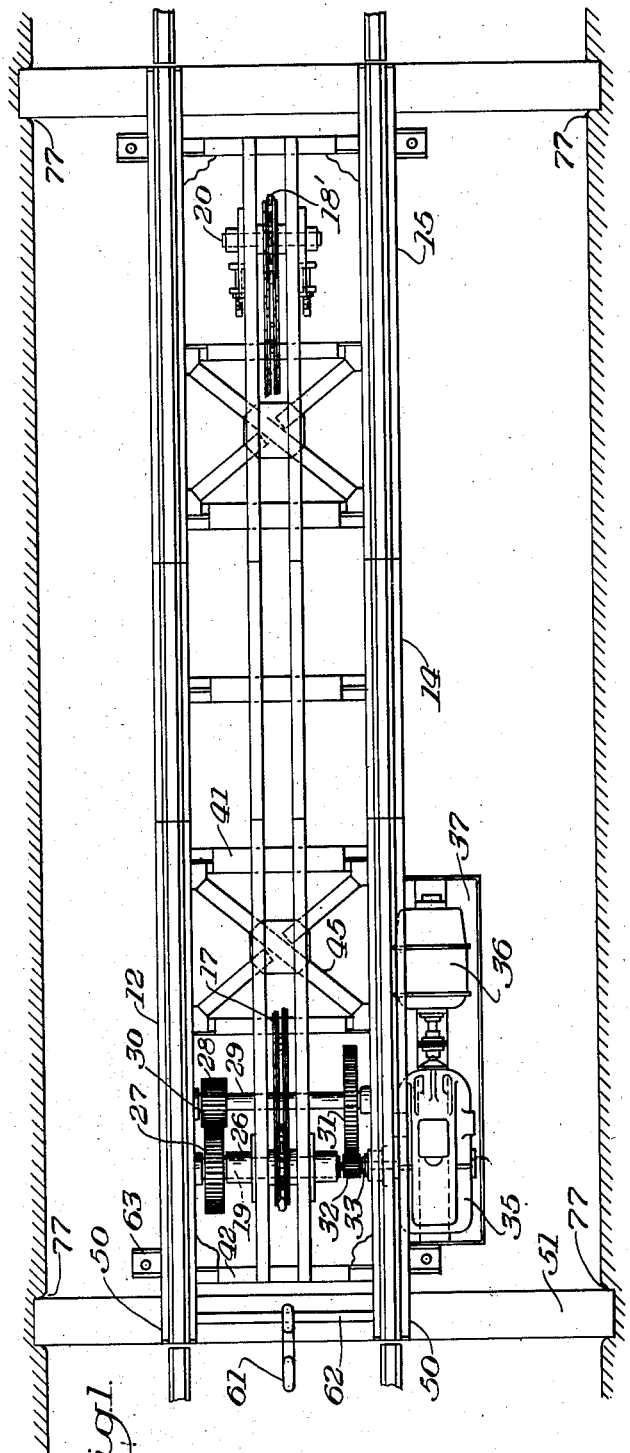
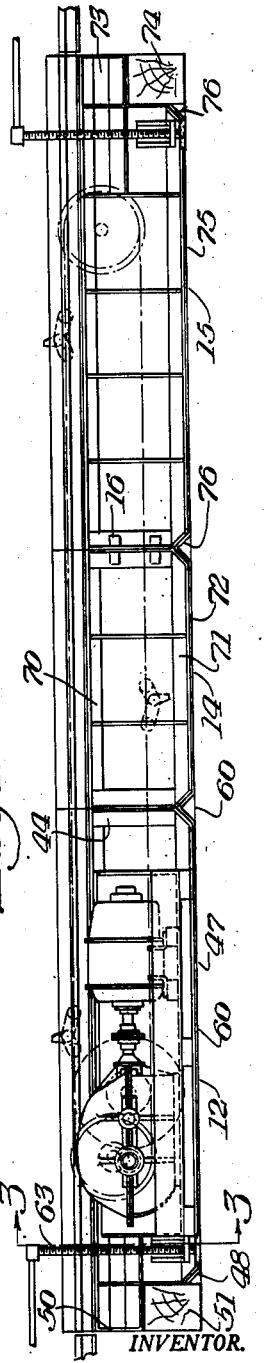
INVENTOR.
Glenn W. Merritt.
BY
George J. Cenninger
Attorney

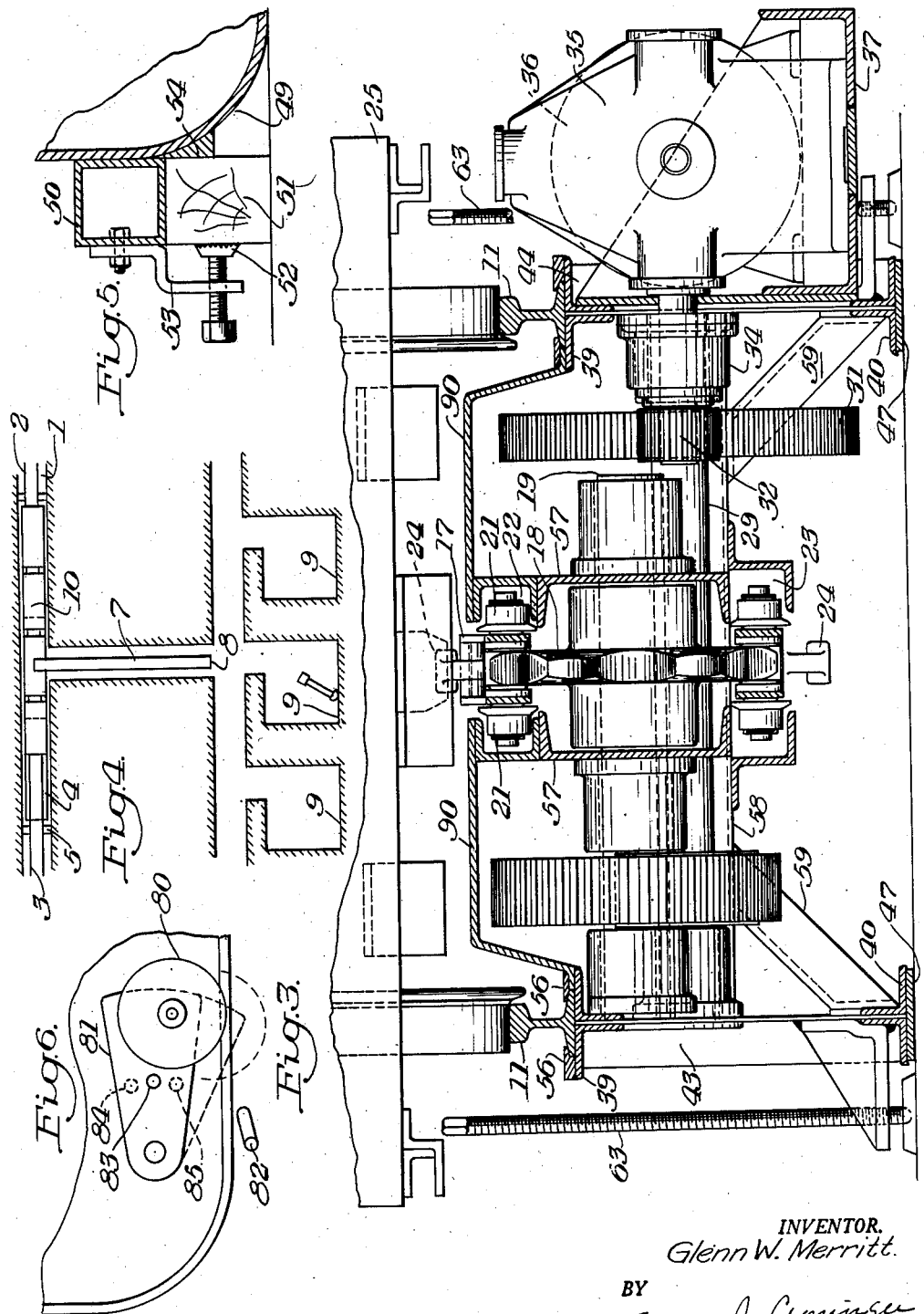

Patented Apr. 26, 1949

2,468,303

UNITED STATES PATENT OFFICE 2,468,303

TRIP FEEDER

Glenn W. Merritt, Bowerston, Ohio, assignor to The Mining Safety Device Company, Bowerston, Ohio, a corporation of Ohio Application July 19, 1944, Serial No. 545,710

5 Claims. (Cl. 104—172)

This invention relates to a trip feeder for moving a number of cars coupled together, for instance mine or railroad cars, in successive order to a loading zone or other desired location, and a method of installing the same in a haulageway.

In mining, the practice has been to construct a trip feeder as a permanent part of the haulageway and it was not intended nor constructed to be moved from place to place. As the working face of the drift receded, the distance to the feeder increased until the cost of transporting the coal thereto became prohibitive and a new feeder location closer to the breast of the workings would be selected. Since the feeder at the old location was more or less a permanent fixture, it was considered more economical to erect an entirely new feeder at the new location, rather than tear out the old feeder. Of course, the old feeder could be torn out and relocated but only at the expense of considerable time and labor plus the need for replacement of parts damaged or broken in the uprooting and dismantling process. Modern mining practices have resulted in faster output and consequently more frequent need for relocating the trip feeder position.

The object of this invention is to provide a trip feeder of simplified, yet rugged construction which easily and quickly may be moved from one location to another, for instance in a mine haulageway, when necessary to change locations; another object is to provide a method of installing the same in a haulageway which will enable the feeder to be quickly installed in a new location or as quickly broken out and removed from one location to another so as not to interfere with or hold up to any great extent, operations in the haulageway.

A trip feeder constructed in accordance with this invention comprises, broadly, a frame, preferably made up of several sections, constructed as a skid to facilitate movement from place to place over rails in the haulageway or the floor itself if rails are not in place and having formations by means of which the frame may be quickly and yet securely chocked in place in a novel manner. The invention contemplates the inclusion of means operable to raise and lower the feeder as well as the inclusion of rollable elements for facilitating movement of the feeder from place to place.

In the drawings:

Figure 1 is a top plan view of the preferred form of trip feeder with certain of the parts broken away.

Figure 2 is a side elevation of the feeder of Figure 1.

Figure 3 is a vertical section taken on line 3—3 of Figure 2.

Figure 4 is a diagrammatic view in plan showing a haulageway with the feeder in place.

Figure 5 is a fragmentary detail in elevation of the forward end of the feeder illustrating a holding clamp and a modified form of skid.

Figure 6 is a detail showing a traction element incorporated in the structure.

With reference to Figure 4, 1 represents a haulageway provided with an approach track section 2 and a receiving track section 3, said trip feeder which is generally designated at 4, being located therebetween with the major portion thereof preferably disposed in a pit 5 below the discharge end 6 of an overhead conveyor 7 located in a corridor extending at right angles to the haulageway. Material delivered to the loading end 8 of the conveyor from the working face 9 of the mine is discharged into the cars of the trip 10, which run on a track 11 on top of the feeder and when a car is filled, the feeder is operated to move the filled car out of loading position and move an empty car into position to be filled. It will be understood that the described location and use in connection with moving a mine trip is by way of example and not necessarily limitation.

The trip feeder, Figures 1 and 2 preferably comprises a sectional frame consisting of an end unit 12, a center unit 14 and end unit 15 that are detachably secured together by bolts 16. The entire frame may be constructed as a single, rather than a sectional unit, however sectional construction further facilitates the work of moving the structure from place to place, particularly where the corridors are narrow with sharp bends and steep inclines.

End unit 12 which I shall call the power unit, contains the driving mechanism for advancing the endless chain 17 which extends from end to end of the feeder and is carried by a front drive sprocket 18 mounted on shaft 19 and a rear sprocket 18' mounted on shaft 20 journaled in bearings secured to frame components forming part of unit 15. The chain is provided with sets of oppositely disposed flanged rollers 21 received in a longitudinally extending split trackway 22 provided to support and guide the upper run of the chain and a similar trackway 23 provided to support any sag in the lower, idle run of the chain. Upstanding lugs 24 are attached to the chain at spaced intervals whose purpose is to engage some part of the cars 25, for instance an axle, and thereby move the trip to replace a filled car at the loading zone with one which is empty.

Shaft 19 is mounted in a bearing 26 secured to frame longitudinals and has a driven gear 27 keyed thereon driven by a gear 28 on shaft 29 journaled in bearings 30 on opposite sides of the frame. Gear 31 keyed on shaft 29 is driven by gear 32 on stub shaft 33, journaled in bearing 34, Figure 3, of a reversible variable speed power transmission 35 driven by motor 36 which may be controlled manually to start and stop the chain. Motor 36 and transmission 35 are carried on a horizontal platform 37 secured between frame verticals on the right-hand side of the unit.

The frame of the power unit comprises spaced upper longitudinals 39 and spaced lower longitudinals 40 therebelow, joined at the front and rear ends by upper and lower laterals, 41 and 42 respectively, and left and right verticals 43 and 44 respectively in front and rear, to form a rectangular box-like frame, braced against twisting by an X-frame 45 or by other properly placed laterals and verticals. The lower longitudinals each have a plate 47 secured to the lower side to provide a wide, stable load supporting surface which serves as a skid enabling the unit to be hauled from place to place on these surfaces. At the front end of each lower longitudinal 40 is an upturned surface 48, either formed as a plane surface, Figure 2, or a curved surface as at 49, Figure 5, to facilitate skidding the frame or manuevering it over obstacles.

The front end of the power unit is provided with projections in the form of box-section laterally extending frames 50 secured to or formed as a part of the main frame to form chock receiving notches, spaces or zones therebelow in which a chock is disposed to hold the unit against movement at the working location in the haulageway. When the power unit is in place in the haulageway, this member rests on a chock which preferably takes the form of a heavy elongated squared timber 51 or equivalent cross support installed transversely of the passage to which the unit may, if desired, be clamped to further stabilize the same and prevent displacement. This may be accomplished by a plurality of horizontally disposed clamps 52 each of which is supported in an offset portion of a bracket 53, Figure 5, detachably bolted to the front end of frame 50. Where the forward end of the skid surface is rounded, wedges 54 may be inserted between the chock and such surfaces for an obvious purpose if the radius of curvature ends above the top of the timber.

The upper longitudinals 39 of the power unit provided a broad bearing surface on which are mounted the rails of track 11, held in place by rail clamps 56, Figure 3. The upper trackway 22 is supported on a pair of oppositely disposed, inwardly facing U-channels 57 (which supports bearing 26) resting on frame laterals, 58, strengthened by angle braces 59. Cover plates 90 joined to the longitudinals 39 and the upper surface of the upper trackway members protect the drive from dirt and damage from material which may fall from the cars and also prevents littering of the haulageway therebelow. Any accumulation on top of the cover plate is easily accessible and as easily removed.

The rear ends of the lower frame longitudinals 40 and bearing surface plates 47 are upturned as at 60 in the same manner as the opposite ends in order that the unit may be hauled from either end with expediency. To facilitate coupling the section to a draw-bar, chain or the like, a swinging hook 61, Figure 1, is attached to the center of a cross bar 62 secured to opposite sides of the frame. One of these may be provided at both ends, if desired. To raise and lower the unit, when preparing to haul it to a new location or in positioning it at a new location, elevating devices such as for instance screw jacks 63, Figures 1, 2 and 3 may be mounted at all four corners (only jacks at the front corners are shown). The jacks may also be employed to provide lateral stability to the feeder where desired.

It will be understood that where the feeder is constructed as a single rather than a sectional unit, it will conform to the specifications of the power unit, as just described, except that it will be extended to the desired length.

In a sectional type unit, the center section will be provided with upper frame longitudinals 70 which will form, in effect, extensions of longitudinals 39 and will support the rails of track 11. The lower frame longitudinals 71 will be provided with skid plates 72 having the ends turned upwardly as and for the purpose described and longitudinal guides will be provided for the chain. This intermediate section may be detached from the power unit and maneuvered independently. If desired, elevating devices 63 may be provided at the four corners. As many of these intermediate sections as desired may be incorporated in a feeder structure, depending upon the overall length of the structure and the number which, in practice, would be found adequate to satisfy the specifications.

End section 15 is substantially the same construction as the power unit 12 except for the omission of the drive. At the rear is a projection 73 similar to frames 50 which are intended to rest on a cross timber 74 disposed at the opposite end of the feeder and may be clamped thereto by means of clamps 52 if desired. Skid surfaces 75 are provided for this unit and each has upturned ends 76 so that the unit may be conveniently maneuvered. Corner jacks 63 may be provided, if desired.

To install said feeder in a haulageway, pairs of notches 77 are cut in the walls thereof at floor level, Figure 1 and a heavy, preferably square section timber 51 laid across the floor of the haulageway and fitted into a pair of notches. Should the notches be oversize, the timber may be firmly wedged in place. The power unit is then skidded up to the timber and clamped securely to it, after which, the intermediate and rear sections are assembled and joined to the power unit and the rear cross timber moved into supporting position and wedged into the rear pair of notches. The clamps are then replaced and drawn down against the timber thereby securely anchoring the entire structure against lateral and longitudinal shifting in the haulageway. Should the feeder be a single rather than a sectional unit, the procedure just described will be followed except for assembling sections together. Should it be necessary to lower the feed into a pit it can be skidded to a position above the floor of the pit on temporary rails and raised off the rails by means of the jacks after which the rails can be removed and the feeder lowered onto the pre-positioned timbers. To facilitate movement over rails, the feeder may be provided with wheels 80, either flanged or smoothed surface, Figure 3, mounted on pivoted journal brackets 81 rotatably secured to the feeder frame. When not in use, the wheels may be raised by elevating the bracket and inserting a pin 82 in a hole 83 in the bracket and a registering hole 84 in the feeder frame. To lower the wheels, the feeder is raised on the jacks and the pin removed which permits the wheels to drop down. The pin is then inserted in hole 83 and a lower hole 85 in the feeder frame. Any number of these wheels may be employed and spaced to fit the gauge of the mine track by cutting out a section of the lower frame longitudinals.

To remove the feeder from a given location in the haulageway, it is necessary to only release the clamps, and lift the feeder sufficiently to clear the timbers which are pulled out of the way and the feeder is ready to be skidded or rolled to the new location.

The matter of relocation is quickly accomplished leaving nothing behind to mark the former location except the notches in the haulageway. There is no loss of equipment due to being permanently affixed to permanent foundations as heretofore. Operations may be reinstated at the new location within a short space of time.

I claim:

1. A unitary frame adapted to be inserted in a railway track at a place where the rails and ties have been removed, the frame having suitable ground engaging means for support while in its operative position, the frame having rails secured to its top surface to align properly at each end thereof with the usual "surface" rails, the frame having, further, car-propelling means and a driving motor therefor.

2. A trip feeder adapted to be positioned at a place in a railway track where the rails and ties have been removed comprising a frame having chock receiving formations at the ends thereof for supporting the frame against displacement in an endwise direction and ground engaging means for providing vertical support formed as a skid upon which said feeder may be moved from place to place when unchocked, rails secured to the upper surface of the frame to align properly at each end thereof with the track and car propelling means carried by said frame.

3. A trip feeder adapted to be positioned at a place in a railway track where the rails and ties have been removed comprising a frame having transverse offsets at the ends thereof for receiving chocks by means of which the frame is supported in operative position against endwise displacement and ground engaging means, formed as a pair of skids extending longitudinally of the frame, one on each side thereof, for providing vertical support for said frame when in operative position and upon which said feeder may be moved from place to place when unchocked, rails secured to the upper surface of the frame to align properly at each end thereof with the track and car propelling means carried by said frame.

4. A trip feeder adapted to be positioned at a place in a railway track where the rails and ties have been removed comprising a frame having transverse chock formations at the ends thereof to receive chocks laid transversely of the railway tracks for supporting the feeder against endwise displacement in operative position, means for raising and lowering said frame relative to chocks therebelow, supporting surfaces formed as a skid upon which said feeder rests when in operative position and upon which said feeder may be skidded from place to place when unchocked, rails secured to the upper surface of said frame to align properly at each end thereof with the track and car propelling means carried by said frame.

5. A trip feeder adapted to be positioned at a place in a railway track where the rails and ties have been removed comprising a frame having transverse chock receiving formations at the ends thereof to receive chocks laid transversely of the railway tracks for supporting the feeder against endwise displacement in operative position, means for securing the feeder to chocks therebelow, supporting surfaces for said frame formed as a skid upon which said feeder rests when in operative position and upon which said feeder may be skidded from place to place when unchocked, rails secured to the upper surface of said frame to align properly at each end thereof with the track and car propelling means.

GLENN W. MERRITT.

REFERENCES CITED

The following references are of record in the file of this patent:

UNITED STATES PATENTS

| Number | Name | Date |
| --- | --- | --- |
| 536,775 | Bennett | Apr. 2, 1895 |
| 760,455 | Hornblower | May 24, 1904 |
| 1,127,661 | Marshall | Feb. 9, 1915 |
| 1,639,726 | Endsley | Aug. 23, 1927 |
| 2,281,503 | Levin | Apr. 28, 1942 |
| 2,363,291 | Brittain | Nov 21, 1944 |

FOREIGN PATENTS

| Number | Country | Date |
| --- | --- | --- |
| 378,699 | Germany | July 27, 1923 |
| 625,684 | Germany | Feb. 14, 1936 |
| 504,319 | Great Britain | Feb. 15, 1938 |